Sept. 8, 1953 A. B. BENSON 2,651,167

DIRECT READ SECONDARY CLOCK AND CORRECTION MECHANISM THEREFOR

Filed July 9, 1948 5 Sheets-Sheet 1

INVENTOR
ALFRED B. BENSON
BY
Edward R. Saunders
AGENT

Sept. 8, 1953 | A. B. BENSON | 2,651,167

DIRECT READ SECONDARY CLOCK AND CORRECTION MECHANISM THEREFOR

Filed July 9, 1948 | 5 Sheets-Sheet 2

INVENTOR
ALFRED B. BENSON
BY
Edward R. Lowndes
AGENT

Sept. 8, 1953 A. B. BENSON 2,651,167

DIRECT READ SECONDARY CLOCK AND CORRECTION MECHANISM THEREFOR

Filed July 9, 1948 5 Sheets-Sheet 3

INVENTOR
ALFRED B. BENSON
BY
Edward R. Lowndes
AGENT

INVENTOR
ALFRED B. BENSON
BY
Edward R. Lounder
AGENT

Sept. 8, 1953 A. B. BENSON 2,651,167

DIRECT READ SECONDARY CLOCK AND CORRECTION MECHANISM THEREFOR

Filed July 9, 1948 5 Sheets-Sheet 5

INVENTOR
ALFRED B. BENSON
BY
Edward R. Lowndes
AGENT

UNITED STATES PATENT OFFICE 2,651,167

DIRECT READ SECONDARY CLOCK AND CORRECTION MECHANISM THEREFOR

Alfred B. Benson, Endicott, N. Y., assignor to International Business Machines Corporation, New York, N. Y., a corporation of New York Application July 9, 1948, Serial No. 37,842

7 Claims. (Cl. 58—26)

The present invention relates to time-keeping apparatus and, more particularly to that type of time-keeping instrument commonly referred to in the art as a direct read clock mechanism wherein, in lieu of the conventional time piece employing hour, minute and second hands mounted for rotation about a common axis concentric with a circular clock dial face, a series of time indicating drum-like accumulators arranged in side-by-side relationship along a common axis are employed. These time-indicating elements usually consist of an hours drum bearing numerical indicia from 1 to 12 inclusive and representing the a. m. or p. m. hours of the day as the case may be; a tens minutes drum bearing numerical indicia from 0 to 5 inclusive, and a units minutes drum bearing numerical indicia from 0 to 9 inclusive. These two latter drums will accommodate the sixty minutes of each hour as numerically expressed from the termination of one hour to the beginning of the next succeeding hour. There may also be included a seconds drum graduated in five second intervals from 60 or 00 to 55 inclusive.

In a copending application of Clinton E. Larrabee, Serial No. 5,447, filed January 30, 1948, now Patent No. 2,569,815, granted October 2, 1951 for Synchronous Motor-Controlled Secondary Clock, there is shown and described a dial face secondary clock which is driven by an individual driving means in the form of a synchronous alternating current motor which receives its impulses from the commercial 60-cycle power line. Means are also provided whereby an electrical signal is transmitted to the secondary clock over the regular power line at a moment which occurs slightly before the end of the fifty-ninth minute of each standard time hour and which terminates precisely at the end of the fifty-ninth minute of the hour, such an impulse serving to initiate a correction cycle whereby, if the secondary clock is running slow with respect to standard time at the end of the fifty-ninth minute of the hour, it will be brought up to the correct time during the sixtieth minute so that when the sixtieth minute is completed and the first minute of the next succeeding hour commences, the clock will be accurately synchronized with the standard time source and will be on time .

The special or time-correcting signal which is imparted to the secondary clock over the regular commercial channel is preferably of a predetermined definite high frequency characteristic and it is employed to energize a magnet which, by tripping a latch, initiates the correction cycle.

As set forth in the above mentioned application, means are further provided whereby stray or transient frequencies which may duplicate the predetermined high frequency signal but which are of momentary duration will have no effect upon the correction cycle.

The present invention specifically relates to a direct read timekeeping instrument which may be employed as one of a series of similar instruments in a centrally controlled time system including a master clock and which is responsive to a high frequency or other correction signal transmitted from a central point for the purpose of initiating a correction cycle by means of which the timepiece may be brought to correct or standard time at predetermined intervals of time in a manner similar to that set forth in connection with the above mentioned application of Larrabee but which employs a somewhat different and novel mechanism for effecting the desired results. The provision of a direct read secondary timepiece capable of periodic correction in the manner briefly outlined above is among the principal objects of the present invention.

In the above mentioned application of Larrabee, a structure exists wherein, briefly, there are provided a pair of correction disks or elements. One of these elements is geared to the minute hand of the clockworks so as to occupy a position at all times commensurate with the chronological position of the minute hand. The other correction element is normally held stationary but shortly after the commencement of the correction cycle it is released and caused to rotate at a relatively fast rate of speed, or, to be exact, at the speed of the seconds hand. A coacting clutch device existing between the two correction elements operates in such a manner that the latter correction element overtakes the former at a point in the correction cycle commensurate with the amount of time by which the clock is slow and, when it so overtakes the first element it picks the latter up, so to speak, and moves the same at the rate of movement of the second hand to accordingly move the minute hand at the same rate of speed and bring the same up to correct or standard time precisely at the end of the correction cycle on the even hour. In dial face clocks of the character shown in the application of Larrabee, the minute hand will, if the clock is on time at the commencement of the correction cycle, occupy a position indicating substantially fifty-nine minutes after the hour. During the correction cycle which consumes one minute of time, the minute hand will continue to advance at its relatively slow rate and arrive on the even hour precisely as the second correction disk overtakes the first correction disk. Thus although the correction instrumentalities will go through the motion of performing an operative correction cycle, no actual correction will take place and the minute and second hands will both occupy their zero position at the commencement of each hour.

Where direct read clocks of the character disclosed herein are concerned, it is necessary to hold the units minutes indicating drum at an indication of 9 with the minutes group reading 59 until the correction cycle has been completed. As a consequence if the clock happens to be substantially on time when the correction cycle begins, the interacting clutch between the two correction disks will take effect and advance the minutes group of indicating drums one full hour. The same holds true when the clock is slow up to and including 59 seconds at the time the correction cycle is initiated. In such an instance the interacting clutch will take effect immediately and advance the minutes group of drums a full hour over and beyond that required to effect true correction.

The present invention is designed to overcome the above noted limitation that has arisen in connection with the design and construction of a self-correcting clock of the direct read type and the accomplishment of this constitutes another major feature and object of the invention.

A still further object of the invention is to provide a direct read clock capable of being automatically corrected at predetermined intervals in the manner set forth in the application of Larrabee in which means are provided for preventing rotation of the seconds indicating drum from interfering with the normal rotational movements of the units minutes indicating drum during the correction cycle.

Other objects of the invention will be pointed out in the following description and claims and illustrated in the accompanying drawings, which disclose, by way of example, the principle of the invention and the best mode, which has been contemplated, of applying that principle.

Figures 6, 6A:
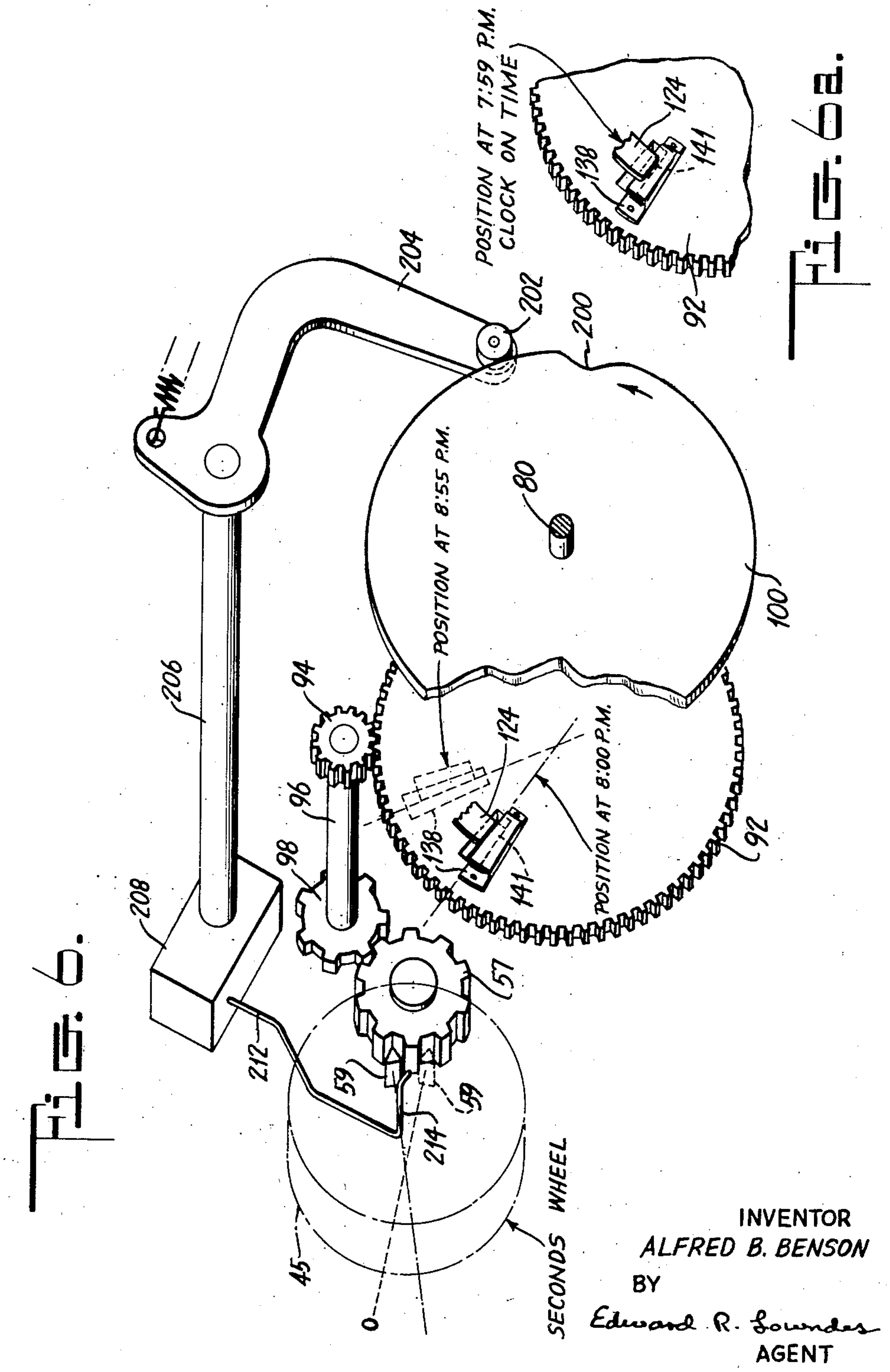
Fig. 6 is an enlarged perspective view somewhat schematic in its representation showing the positions of certain of the correction instrumentalities at various periods of time for purposes of illustration of the invention.

Fig. 6*a* is a fragmentary view illustrating another position of the correcting instrumentalities.

In all of the above described views, like characters of reference are employed to designate like parts throughout.

Referring now to the drawings in detail, it will be understood that the disclosure thereof represents only the clockworks or chassis of a direct read secondary timepiece constructed in accordance with the principles of the present invention. The base plate and exterior clock casing which may be of any suitable design are not illustrated in detail and they may be varied in shape to accommodate different styles of the complete timepiece, as for example to provide a desk clock, a wall clock or a workman's time recorder. Irrespective of the particular style of clock desired, the essential features of the invention are at all times preserved.

Figure 1:
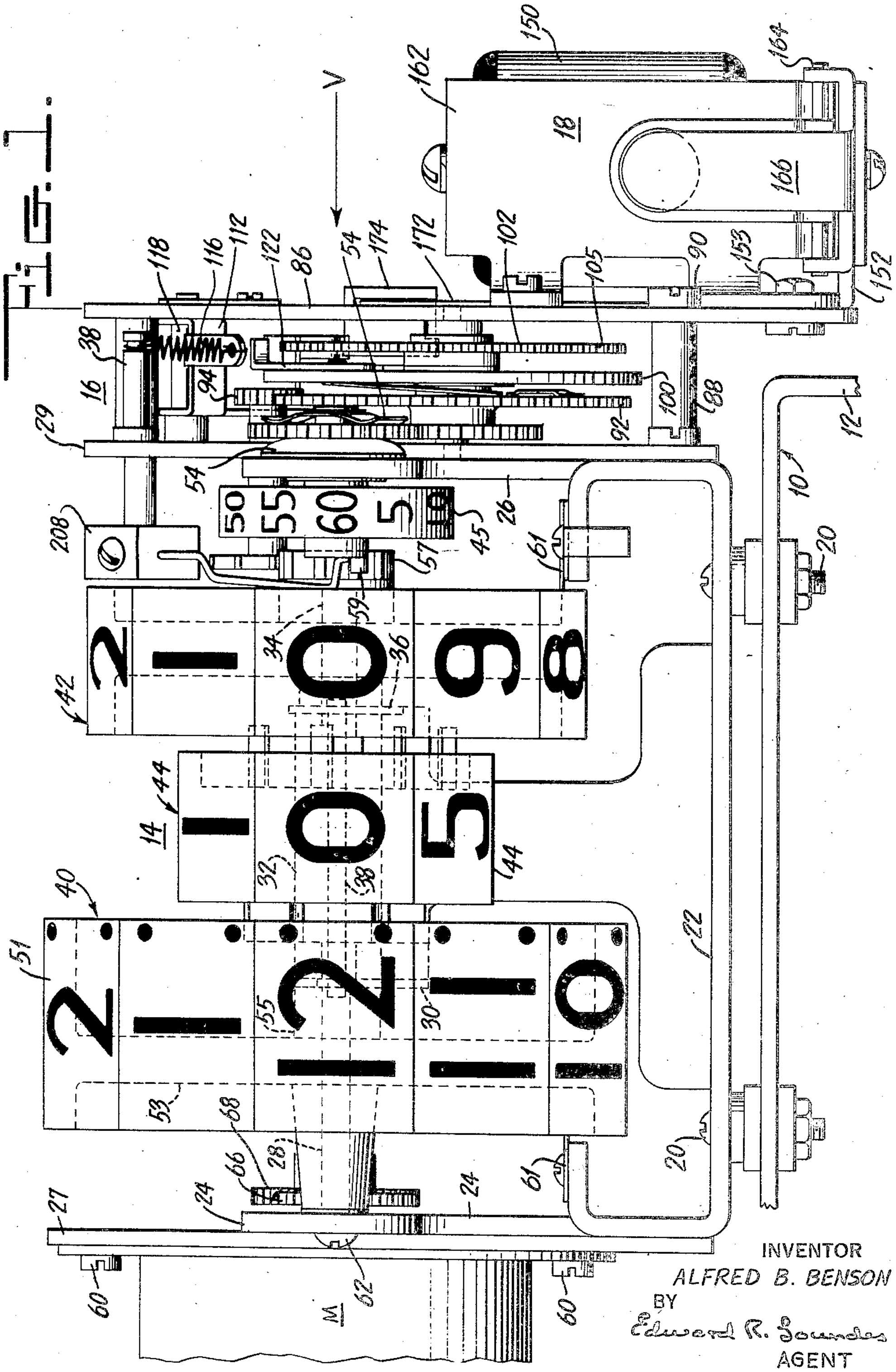
Fig. 1 is a front elevational view of a direct read clock mechanism constructed in accordance with the principles of the present invention.
Figure 2:
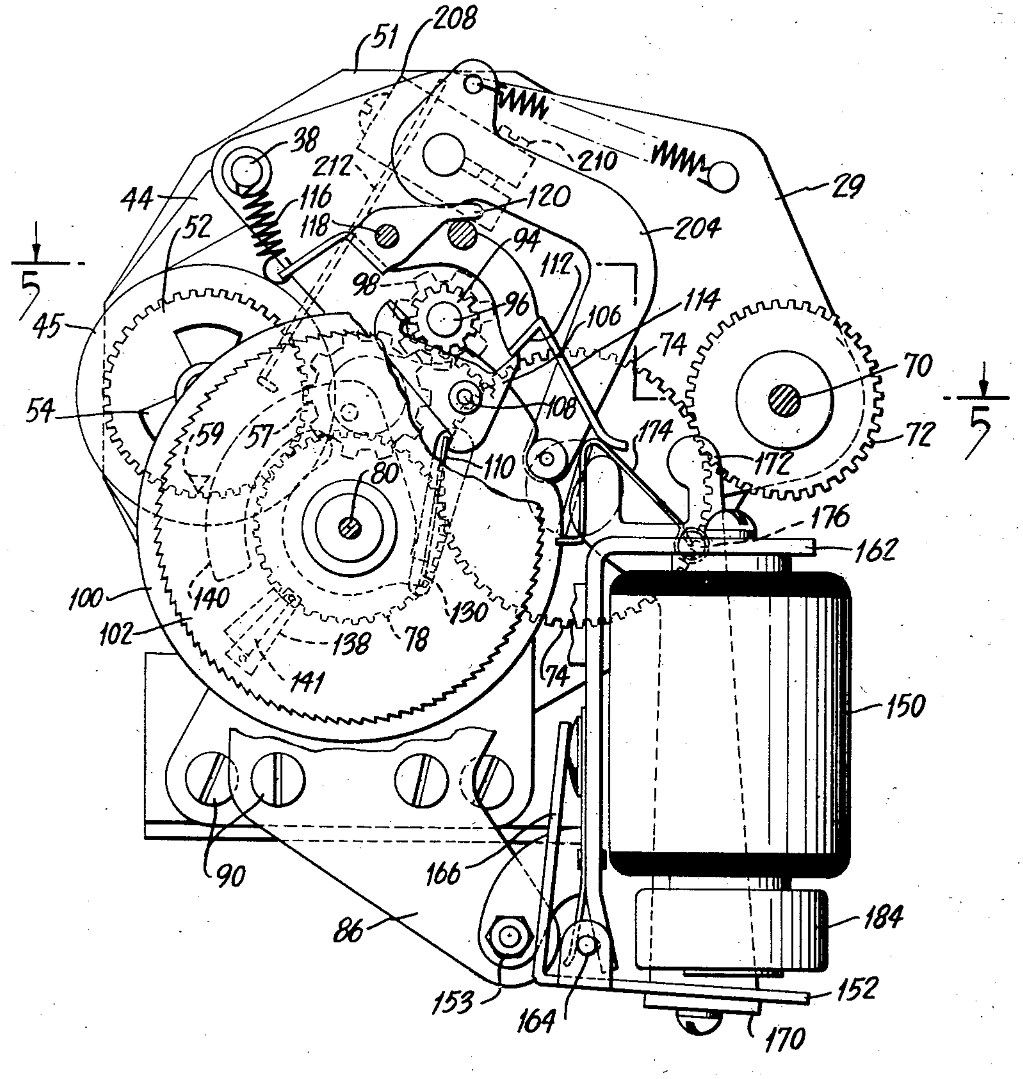
Fig. 2 is a side elevation view taken from the right side of Fig. 1 with certain parts broken away.

Referring particularly to Figs. 1 and 2, the clockworks involves in its general organization a main supporting plate or standard 10 which is generally of inverted U-shape in cross section and the downwardly extending sides 12 thereof are adapted to be suitably attached to a base plate, wall bracket or the like (not shown). The supporting plate 10 serves as the sole supporting means for the entire clockworks including a driving motor M, individual drum assemblies 14, clock drive and correction assembly 16, and trip magnet assembly 18. The composite assemblies 14, 16 and 18 just set forth are carried on the supporting plate 10 by means of a floating connection including resilient spacing and attachment assemblies 20 associated with a generally U-shaped bracket 22 including upstanding side members 24 and 26 having secured thereto in any suitable manner as for example by means of screws 25, respective supporting standards 27 and 29.

A stud 28 (Fig. 1) is fastened to the side member 24 by a screw 62 and has an end thereof threadedly received in the side flange 30 of the U-shaped bracket 32. A similar stud 34 passes through the side member 26 and has an end thereof threadedly received in the other side flange 36 of the U-shaped bracket 32. A stud 38 extends across the outer ends of the U-shaped bracket 32. The stud 28 serves as a support for a relatively large hours drum, counter or accumulator 40. The stud 34 serves as a support for a somewhat smaller units minutes drum or counter 42, while the stud 38 serves as a support for a relatively small tens minutes drum 44.

The seconds drum 45 (see also Fig. 5) is of diminutive design and is threadedly received on the reduced end 46 of a rotatable shaft 48, the latter being journalled in a bushing 50 common to and carried by the support 26 and standard 29. The shaft 48 has loosely mounted thereon a driving gear 52. A spider-like friction spring 54 is secured to the end of the shaft 48 and has a series of bowed friction fingers 56 which bear at their ends against one side of the gear 52, thus constraining the seconds drum 45 to follow the rotational movements of the gear 52 but permitting the same to be held motionless when occasion demands for a purpose and in a manner that will become clear presently.

The time-indicating drums 40, 42, 44 and 45 are, in the main, of conventional design and each includes a generally polygonal drum surface 51, a web portion 53 and a hub 55 which on one side carries the usual Geneva driven gear 57 and on the other side the usual driving tooth 59. The specific number of teeth included in the various gears 57 is calculated according to engineering exigencies in such a manner that, with the seconds drum 45 rotating at the rate of one revolution per minute, the units minutes drum 42 will make a complete revolution once every ten minutes; the tens minutes drum 44 will make a complete revolution once every hour, and the hours drum will make a revolution every twelve hours. Suitable spring detent devices 61 serve to locate the various dead center points of the various drums and mantain them in such positions that the indicia thereon are accurately aligned with the viewing opening provided in the clockwork casing (not shown). The line of vision for viewing the various indicia is shown by the arrow V in Fig. 1.

The electric motor M is secured in any suitable manner, as for example by means of screws 60 (Fig. 1) to the standard 27 and its output shaft extends through the standard 27 and the side member 24 and carries thereon a gear 66 which meshes with a similar gear 68 carried on a drive shaft 70 (see also Fig. 5) extending between and journalled in the standards 27 and 29. The shaft 70 projects completely through the standard 29 and carries a gear 72 thereon which meshes with an idler gear 74 mounted on a stud 76 carried by the standard 29. The gear 74 meshes with a gear 78 fixedly mounted on a counter-shaft 80, which, by virtue of its function will hereinafter be referred to as the correction shaft (see also Figs. 3 and 4). The gear 78 meshes with the previously mentioned driving gear 52 which serves to drive the seconds drum 45 through the friction drive assembly 48, 54, and 56.

The correction shaft 80 is rotatably journalled as at 82 at one end in the standard 29 and at the other end as at 84 in a plate 86 which is supported by means of spacing sleeves 88 and clamping bolts 90 from the standard 29 in spaced relationship with respect thereto.

From the above description it will be seen that the shaft 70 which is driven from the motor M imparts continuous motion to the gear train including the gears 72, 74, 78 and 52 as well as to the correction shaft 80. The gear 52 normally imparts rotational motion to the seconds drum 45 except at such times as the latter is purposely held motionless during all or a portion of a correction cycle for reasons that will be made clear presently.

Figure 5:
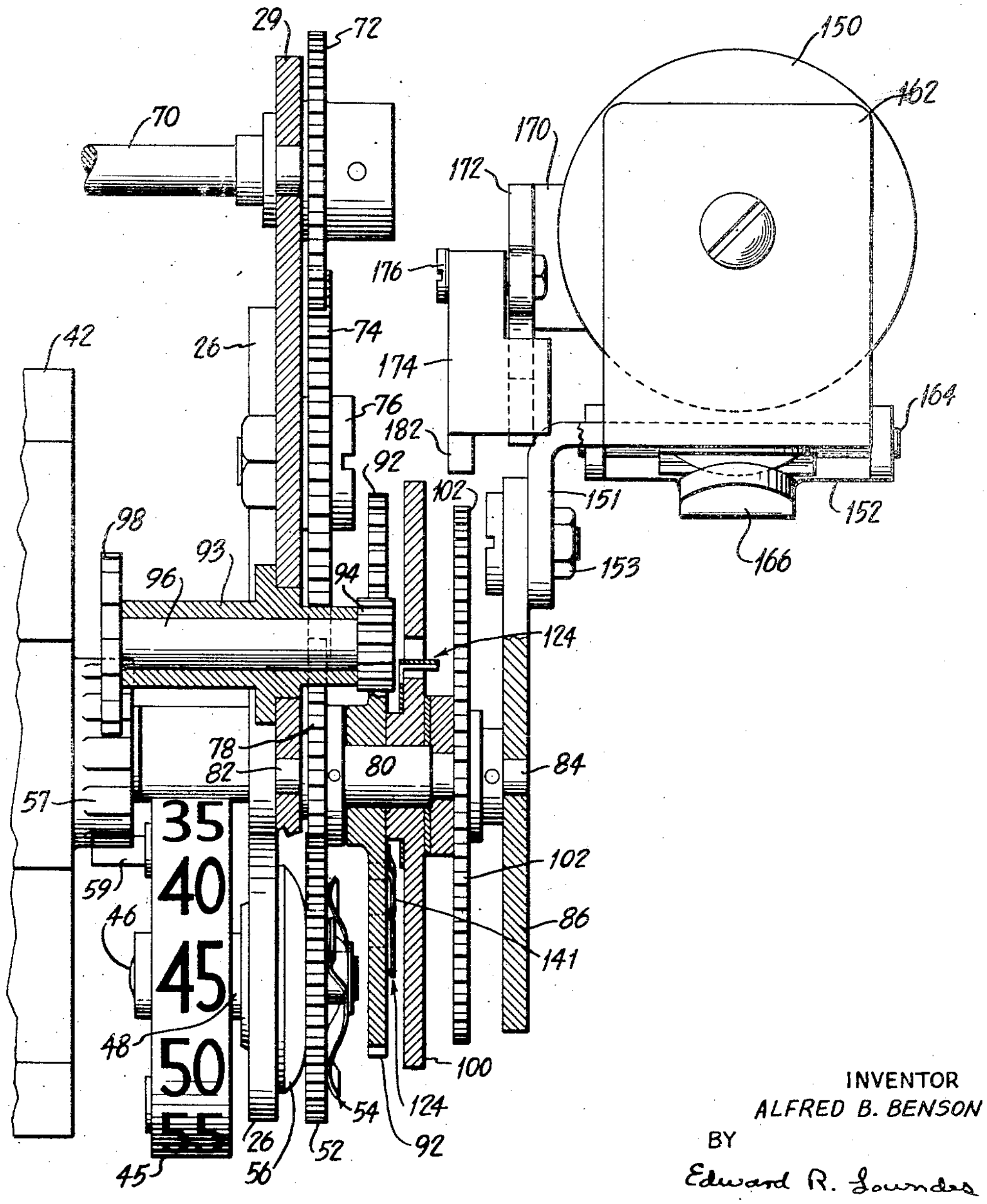
Fig. 5 is a sectional view taken along the line 5—5 of Fig. 2, the said view being rotated 90° counterclockwise in the plane of the paper.

Referring now to Figs. 1, 5 and 6, the correction shaft 84 has loosely and rotatably mounted thereon a relatively large correction gear 92 which meshes with a relatively small gear 94 carried on one end of a short shaft 96 rotatably journalled in the standard 29. A gear 98 on the other end of the shaft 96 meshes with the Geneva drive gear 57 formed on the hub 55 of the units minutes drum 42. The angular position of the gear 92 which, in reality, may be regarded as one of a pair of correction disks associated with the correction mechanism, is therefore at all times dependent upon the angular or chronological position of the units minutes drum 42. In other words, the correction gear 92 and the units minute drum 42 at all times move in unison or remain stationary as occasion demands. A spacing sleeve 93 surrounds the shaft 96 to maintain the gears 94 and 98 in proper peripheral registry with the gears 92 and 57 respectively.

The correction gear 92 is adapted to cooperate with a second correction member in the form of a disk 100 also loosely mounted on the correction shaft 80. The disk 100 is normally held motionless by means of a latch mechanism which will be described subsequently but it is adapted during the correction cycle to make clutching engagement with the constantly rotating correction shaft 80, to consequently receive motion therefrom and to impart its motion to the correction gear 92. The correction shaft 80 is adapted to be continuously rotated by the previously described driving train from the motor M at the rate of one revolution per minute. During rotation of the correction gear 92, when the latter receives its motion from the correction disk 100, the train of gears leading to the units minutes drum 42 and including the gears 92, 94, 98 is so designed that a relatively fast rate of continuous motion is imparted to the drum 42, this rate of rotation amounting to one revolution each ten seconds in order that the units minutes and tens minutes group 42, 44 may be brought to their zero positions at the completion of the correction cycle which terminates at the end of the sixtieth minute of each hour.

A relatively large toothed disk 102 is fixedly secured to the correction shaft 80 and the teeth 105 thereon are relatively small and closely spaced to effect a tractional function in connection with the time delay mechanism which will be made clear presently. It should be borne in mind at this point that the gears 72, 74, 78, shaft 80 and disk 102 remain in constant rotation at all times while the motor M is energized. The toothed disk 102 is adapted to impart its relatively fast rate of rotation to the time correcting disk 100 which is loosely mounted on the constantly rotating counter shaft 80. This time recording disk 100 is normally held against rotation at a predetermined angular position by means of a latch finger 104 (Figs. 2, 3 and 4) formed on a pivoted clutch piece 106 which is pivotally secured as at 108 to one face of the time correcting disk 100. The clutch piece 106 is spring pressed as at 110 in such a manner as to normally bias the same in a counter-clockwise direction as viewed in Figs. 3 and 4. The latch finger 104 normally bears against a shoulder 112 associated with a latch member 114 which is spring pressed as at 116 and is pivoted on a shaft 118 extending between the plate 86 and standard 29. The latch member 114 is formed with a laterally extending finger 120 designed for engagement with a stop piece which for convenience may be one of the spacing pillars 88 previously mentioned.

The clutch piece 106 is formed with a laterally turned clutch tooth 122 designed for tractional engagement with the periphery of the toothed disk 102 when the clutch piece is released by the latch member 114. Normally, with the latch finger 104 bearing against the shoulder 112 of the latch member 114, the clutch piece 106 is urged in a clockwise direction as viewed in Fig. 3 against the action of the spring 110 to cause the clutch tooth 122 to disengage the toothed periphery of the constantly rotating traction disk 104 so that the correction disk 100 is forcibly held or latched against rotation. However, as will be seen presently, when the latch member 114 is tripped or swung in a counterclockwise direction as viewed in Figs. 2, 3, and 4, the shoulder 112 will move away from the latch finger 104, thus allowing the spring 110 to move the clutch piece 106 in a counter-clockwise direction and effect tractional clutching engagement between the correction disk 100 and the traction disk 104 so that these two elements will rotate in unison uniformly throughout one complete revolution during the course of one minute. Such rotation in unison occurs only during the correction cycle which commences shortly before the end of the fifty-ninth minute of each hour and which terminates precisely as the next hour commences.

Secured to one face of the correction disk 100 is a pick-up spring piece 124 of irregular design which is riveted or otherwise secured as at 126 to the disk. The spring piece 124 includes an arcuate outwardly extending spring pick-up arm 128 and an inwardly extending portion 130 which projects through an opening 132 formed in the disk and which on the other side of the disk is provided with a lateral extension that constitutes the spring 110 which serves to bias the pivoted clutch piece 106.

The correction gear 92 is formed with a radially extending slot 138 which is situated inwardly a slight distance from the periphery of the disk and which is designed to cooperate with an out-turned end 140 provided on the arcuate spring pick-up arm 128. The distance between the plane of the correction disk 100 and the correction gear 92 and the reach of the spring arm 124 is such that the out-turned end 140 of this arm is adapted to frictionally bear against the surface of the correction gear 92 at all times during normal operation of the clock when the latter is correct or on time and during a varying portion of each correction cycle when the latter is effective to perform a correcting function. At other times during the correction cycle the out-turned end 140 of the spring arm 128 is adapted to enter the slot 138 in the correction gear 92 and abut against one edge of this slot to impel the disk rotatably for time-correcting purposes in a manner that will appear presently. The spring arm 128 and slot 138 comprise the two coacting parts of a one-way coupling between the two correction elements 100 and 92. A plate 141 is secured as at 143 to one side of the gear 92 and partially overlies the slot 138 and performs an important function which will be described hereinafter.

It should be borne in mind at this point that the correction disk 92 is loosely mounted on the correction shaft 80 and that it is geared through the gear 94, shaft 96 and gears 98 and 57 (Fig. 6) to the units minutes indicating drum 42. It is therefore compelled to follow the periodic indexing movements of the drum 42 and therefore the angular position of the slot 138 bears a definite relationship to the angular position of the drum 42.

It has been seen how the toothed disk 102 is adapted to be positively driven continuously at the rate of one revolution per minute as long as the motor M remains energized. It has also been seen how the correction gear 92 is adapted to be periodically indexed in synchronism with the indexing of the units minutes drum 42 through the action of the Geneva gear drive mechanism as long as the clock is on time. Even if the clock is running slow with respect to chronological time, the correction gear is adapted to be periodically indexed along with the indexing of the drum 42 and this regular indexing motion of the gear 92 will not be disturbed until such time as the two correction elements 92 and 100 are coupled and motion is applied to the gear 92 from the disk 100. For practical purposes then, and for purposes of terminology in the accompanying claims, the toothed disc 102 may be regarded as a seconds member of the clock system and the correction gear 92 may be regarded as the intermittently indexible unit minutes member of the direct read system. An object of the invention is to transmit motion from the former to the latter when, and only when, necessary to effect advancement of the units minutes at a comparatively rapid rate of speed.

It has been explained previously that at the end of the fifty-ninth minute after each chronological hour, the latch member 114 is adapted to become tripped to release the latch finger 104 of the clutch element 106 to permit the correction disc 100 to commence its cycle of rotation, during which it rotates one complete revolution and is again stopped at the end of the sixtieth minute of the hour. Tripping of the latch member 114 is effected under the control of an electromagnet 150 which, upon energization thereof, attracts its armature 152 (Fig. 2) and sets into action a time delay mechanism designated in its entirety at 154, the nature of which will be explained fully hereinafter. From the instant of energization of the magnet 150 until the instant of tripping of the latch member 114, a period of approximately three seconds intervenes for the purpose of preventing stray or transient frequencies coming over the power line and of shorter duration than three seconds from affecting the latch member 114. Actually then, the energizing signal, which is of such high frequency as to not disturb the normal functions of the 60-cycle current frequency constantly issuing over the line, is applied to the magnet approximately three seconds before the commencement of the sixtieth minute after each chronological hour but the latch member 114 is not tripped until approximately the commencement of the sixtieth minute after the chronological hour.

The electromagnet 150 which forms an element of the previously described assembly 18 is carried on an angular bracket 162 secured as at 153 to the plate 86 and includes an armature 152 which is pivoted on a pair of trunnions 164 which project laterally from the lower end of the bracket 162. The armature 152 is provided with an upwardly extending stop arm 166 designed for engagement with a limit stop 168 carried on the bracket 162 when the magnet is deenergized. A weight 170 carried by the armature 152 serves by gravity to restore the armature after energization of the magnet to its normal position.

An actuating arm 172 is secured to the armature 152 and extends upwardly therefrom along one side of the magnet 150. A trip member 174 is pivoted on a stud 176 carried near the upper end of the actuating arm 172 and is provided with an upwardly extending portion 178, a downwardly extending portion 180 and a laterally extending toothed portion 182, the forward edge of which is designed for engagement with the teeth formed on the toothed disc 102. When the magnet 150 is energized and the armature 152 is attracted so as to throw the upper end of the lever 172 to the left as viewed in Figs. 3 and 4, the forward edge of the toothed portion 182 engages the toothed periphery of the disk 102 as shown in dotted lines in Fig. 1. Such tractional egagement of the trip member 174 with the periphery of the disc 102 causes the forward end of the trip member to be lifted upwardly so that the trip member is gradually swung in a clockwise direction at a time occurring approximately three seconds after initial energization of the magnet 150. The upwardly extending portion 178 of the trip member engages the latch member 114 and moves the same in a counterclockwise direction, thus withdrawing the latch shoulder 112 from the path of movement of the latch finger 104 and initiating the correction cycle, as previously described. When deenergization of the magnet 150 occurs three seconds after its initial energization, the latch 114 will have been tripped. At this time the arm 172, under the influence of gravity, is restored to its initial position and the trip member 174 moves away from the periphery of the toothed disc 102 and the trip member returns to its position of rest wherein it bears against the upper end of the arm 172.

In addition to the mechanical delay means described above for delaying the effective tripping of the latch member 102 until approximately three seconds after the initiating high frequency signal has been received, an electrical means of delaying the attraction of the magnet 150 is contemplated. This electrical delay means is in the form of a copper cylinder or jacket 184 which surrounds the core of the magnet 150 at the armature end thereof and acts as a shorted turn thereon. The principle of operation of shaded coil magnets is well known in the art and need not be described herein, suffice it to say that by the provision of the copper jacket 184 transient frequencies lasting less than approximately one-half of a cycle or $1/120$ of a second will prevent effective energization of the magnet 150 and consequent chattering of the armature 152 and its associated parts.

In Fig. 6 the correction disk 92 is shown in full lines in the position it will occupy on the even hour, for example, 8:00 p. m. At this particular time the correction cycle has just been completed and the end 140 of the spring arm 124 carried by the correction disk 100 is in register with the slot 138. One minute later, namely at 8:01 p. m. the Geneva tooth 59 of the seconds indicating drum drum 45 will engage one of the teeth on the Geneva gear 57 and advance the drum, and consequently the correction gear 92 so that the slot 138 will move away from the end of the spring finger 124. Each successive rotation of the seconds drum 45 will advance the correction gear 92 thirty-six degrees and, at precisely the end of the fifty-ninth minute after the hour, which is the time of commencement of the next correction signal at 8:59 p. m., the plate 141 will move under the end of the finger 124 and remain there motionless as shown in Fig. 6*a*. As soon as the time delay feature of the trip mechanism described above has taken effect shortly after 8:59 p. m. and the correction disk 100 commences to rotate again, the end of the finger 124 will ride off of the plate 141 to the left in a counterclockwise direction as viewed in Figs. 3, 4 and 6, and the end of the finger 124 will describe a complete circle on the surface of the correction gear 92, arriving at the position shown in full lines in Fig. 6 at approximately 9:00 p. m.

Figures 3, 4:
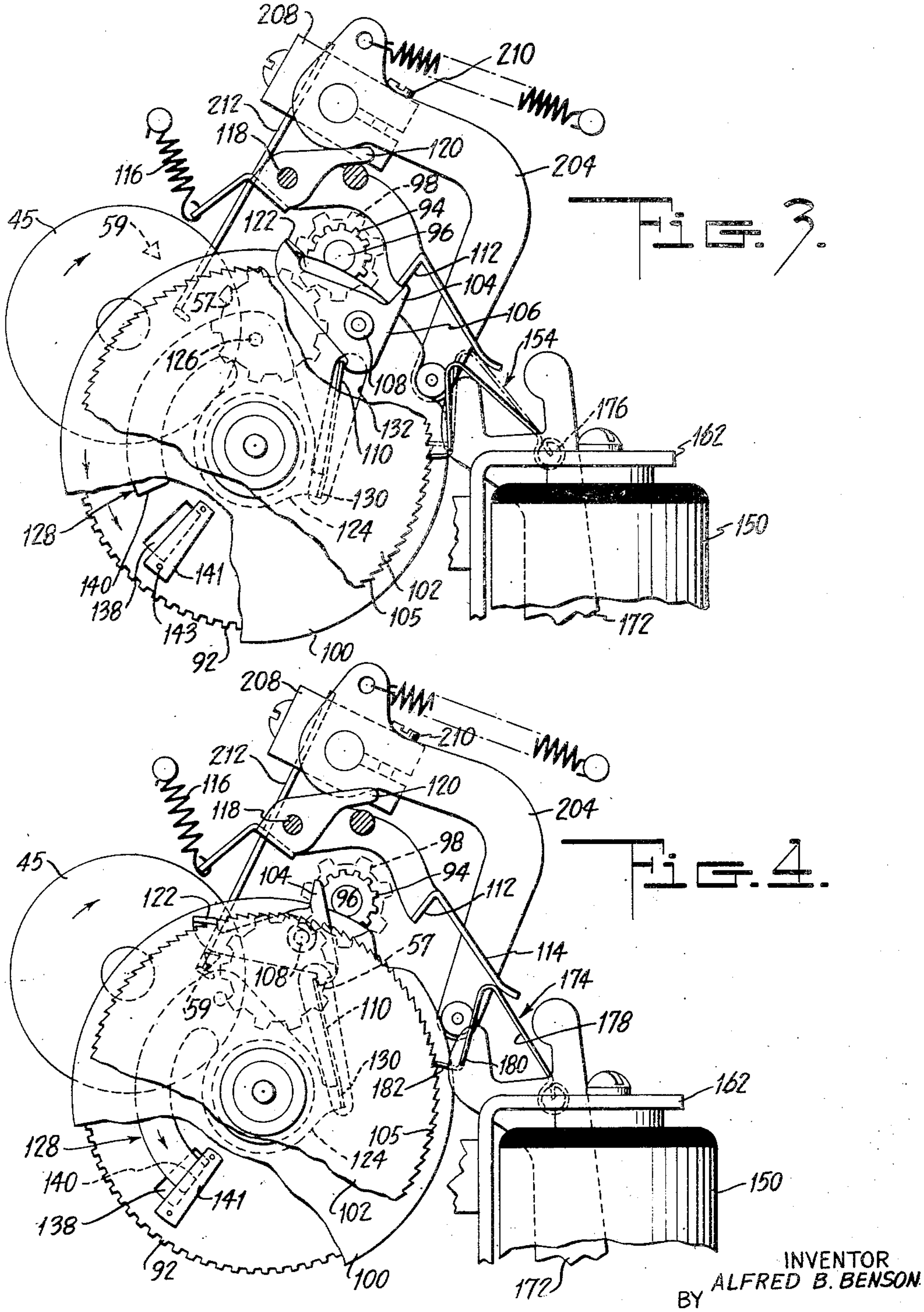
Fig. 3 is an enlarged fragmentary view of a portion of the correction mechanism shown in Fig. 2 and with the various parts thereof assuming the position they occupy at the commencement of a correction cycle and at the beginning of a latch tripping operation employed in connection with the present invention.
Fig. 4 is a sectional view similar to Fig. 3 with the parts in the position they assume at the end of the latch tripping operation.

Referring now to Figs. 3, 4 and 6, it has been found necessary to block further movement of the seconds indicating drum 45 when the reading thereof arrives at 59 seconds during any particular correction cycle in order to prevent the relatively slow moving tooth geneva 59 from clashing or jamming with the faster moving teeth on the Geneva gear 59 of the units minutes drum which at that time is being moved continuously under the influence of the gear train 92, 94, 98 (Fig. 6). Toward this end the correction disk 100 has formed in the periphery thereof a notch or indentation 200 designed for cooperation with a roller 202 carried at the end of a curved arm 204 mounted on a rock shaft 206 journalled in and supported by the standard 29. The rock shaft 206 carries a block 208 which is adjustable thereon by means of clamping screws 210 and a stop arm 212 projects downwardly from the block 208 and has a laterally turned end 214 which is movable into and out of the path of movement of the Geneva tooth 59 formed on the seconds indicating drum.

When the correction disk 100 assumes a position so that the roller 202 is seated within the depression 200, the laterally turned end 214 of the arm 212 will be out of the path of movement of the tooth 59 and the normal Geneva driving action between the various indicating drums may take place. However, when the correction cycle is initiated and the correction disk 100 moves from its home position the roller 202 will ride outwardly on the periphery of the disk 100, thus rocking the shaft 206 and projecting the turned end 214 of the finger 212 into the path of the oncoming Geneva tooth 59.

Obviously, since the home position of the disk 100 is such that the roller 202 lies within the depression 200, at the end of each correction cycle the laterally turned end 214 of the finger 212 will be clear of the Geneva tooth 59 and normal Geneva function between the various time indicating drums may take place. Additionally, it will be seen that if at the commencement of a particular correction cycle, the seconds indicating drum 45 is in an advanced position registering for example, 45 seconds, the tooth 59 will arrive in close proximity to the Geneva gear 57 of the units minutes wheel approximately 15 seconds later and the projected finger 212 will retard further rotation of the seconds member until the end of the correction cycle when it will release the drum 45 precisely on the even hour.

While there have been shown and described and pointed out the fundamental novel features of the invention as applied to a preferred embodiment, it will be understood that various omissions and substitutions and changes in the form and details of the apparatus illustrated and in its operation may be made by those skilled in the art, without departing from the spirit of the invention. It is the intention, therefore, to be limited only as indictaed by the scope of the following claims.

What is claimed is:

1. In a direct read secondary clock mechanism, a rotatable seconds member, a rotatable units minutes member, means normally rotating said seconds member continuously and uniformly at its normal time-keeping rate of one revolution per minute, Geneva driving gear mechanism operatively connecting said members whereby continuous rotation of the seconds member causes intermittent rotation of the units minutes member, a rotatable clock-advancing member, clutch means normally connecting said clock-advancing member and seconds member in driving relationship for causing the latter to rotate at the speed of the former, a latch member normally rendering said clutch means inoperative, means for tripping said latch member to permit said clutch means to become operative, said last mentioned means comprising an electromagnet responsive to the reception of a signal at a predetermined chronological time, and coupling means between said clock-advancing member and units minutes member operable when the latter is at a chronological position slower than standard time and when said clutch means is operative for driving said units minutes member continuously and uniformly at the rate of said clock-advancing member for an angular distance sufficient to advance the units minutes member to a chronological position coincident with standard time.

2. In a direct read secondary clock mechanism, a rotatable seconds member, a rotatable units minutes member, means normally rotating said seconds member continuously and uniformly at its normal time-keeping rate of one revolution per minute, Geneva driving gear mechanism operatively connecting said members whereby continuous rotation of the seconds member causes intermittent rotation of the units minutes member, a rotatable clock-advancing member, clutch means normally connecting said clock-advancing member and seconds member in driving relationship for causing the latter to rotate at the speed of the former, a latch member normally rendering said clutch means inoperative, means for tripping said latch member to permit said clutch means to become operative, said last mentioned means comprising an electromagnet responsive to the reception of a signal at a predetermined chronological time, said units minutes member and clock-advancing member being mounted for rotation about a common axis, and a one-way coupling comprising a first co-acting part on the units minutes member movable bodily therewith and a second co-acting part on the clock-advancing member, said coupling parts being movable in approximately the same circular path and being constructed so that the first part may move in one direction past the second part without affecting the condition of relative movement of said members and so that the second part, when moving in the opposite direction at a faster rate than the first part, upon overtaking the first part engages and drives the latter and consequently the units minutes member at the rate of said clock-advancing member.

3. In a direct read secondary clock mechanism, a rotatable seconds member, a rotatable units minutes member, means normally rotating said seconds member continuously and uniformly at its normal time-keeping rate of one revolution per minute, Geneva driving gear mechanism operatively connecting said members whereby continuous rotation of the seconds member causes intermittent rotation of the units minutes member, a rotatable clock-advancing member, clutch means normally connecting said clock-advancing member and seconds member in driving relationship for causing the latter to rotate at the speed of the former, a latch member normally rendering said clutch means inoperative, means for tripping said latch member to permit said clutch means to become operative, said last mentioned means comprising an electromagnet responsive to the reception of a signal at a predetermined chronological time, said units minutes member and clock-advancing member being mounted for rotation about a common axis, a one-way coupling comprising a first coacting part on the units minutes member movable bodily therewith and a second coacting part on the clock-advancing member, said coupling parts being movable in approximately the same circular path and being constructed so that the first part may move in one direction past the second part without affecting the condition of relative movement of said members and so that the second part, when moving in the opposite direction at a faster rate than the first part, upon overtaking the first part engages and drives the latter and consequently the units minutes member at the rate of said clock-advancing member, and means operable when the first part has moved past the second part in the one direction specified a distance less than a predetermined amount and thereafter the second part moves in the opposite direction the latter upon overtaking the former will fail to engage and drive the same.

4. In a direct read secondary clock mechanism, a rotatable seconds member, a rotatable units minutes member, means normally rotating said seconds member continuously and uniformly at its normal time-keeping rate of one revolution per minute, Geneva driving gear mechanism operatively connecting said members whereby continuous rotation of the seconds member causes intermittent rotation of the units minutes member, a rotatable clock-advancing member, clutch means normally connecting said clock-advancing member and seconds member in driving relationship for causing the latter to rotate at the speed of the former, a latch member normally rendering said clutch means inoperative, means for tripping said latch member to permit said clutch means to become operative, said last mentioned means comprising an electromagnet responsive to the reception of a signal at a predetermined chronological time, coupling means between said clock-advancing member and units minutes member operable when the latter is at a chronological position slower than standard time and when said clutch means is operative for driving said units minutes member continuously and uniformly at the rate of said clock-advancing member for an angular distance sufficient to advance the units minutes member to a chronological position coincident with standard time, and means operable during such continuous driving movement of said units member for rendering said Geneva driving gear mechanism inoperative.

5. In a direct read secondary clock mechanism, a rotatable seconds member, a rotatable units minutes member, means normally rotating said seconds member continuously and uniformly at its normal time-keeping rate of one revolution per minute, Geneva driving gear mechanism operatively connecting said members whereby continuous rotation of the seconds member causes intermittent rotation of the units minutes member, a rotatable clock-advancing member, clutch means normally connecting said clock-advancing member and seconds member in driving relationship for causing the latter to rotate at the speed of the former, a latch member normally rendering said clutch means inoperative, means for tripping said latch member to permit said clutch means to become operative, said last mentioned means comprising an electromagnet responsive to the reception of a signal at a predetermined chronological time, and coupling means between said clock-advancing member and units minutes member operable when the latter is at a chronological position slower than standard time and when said clutch means is operative for driving said units minutes member continuously and uniformly at the rate of said clock-advancing member for an angular distance sufficient to advance the units minutes member to a chronological position coincident with standard time.

6. In a direct read secondary clock mechanism, a rotatable seconds member, a rotatable units minutes member, means normally rotating said seconds member continuously and uniformly at its normal time-keeping rate of one revolution per minute, Geneva driving gear mechanism operatively connecting said members whereby continuous rotation of the seconds member causes intermittent rotation of the units minutes member, a rotatable clock-advancing member, clutch means normally connecting said clock-advancing member and seconds member in driving relationship for causing the latter to rotate at the speed of the former, a latch member normally rendering said clutch means inoperative, means for tripping said latch member to permit said clutch means to become operative, said last mentioned means comprising an electromagnet responsive to the reception of a signal at a predetermined chronological time, an armature for said electromagnet, a trip member pivotally connected to said armature and movable bodily therewith, said trip member being movable when said armature is attracted by the electromagnet into frictional engagement with said seconds member and being movable tractionally upon such frictional engagement from an inoperative position to an operative position wherein it actuates said tripping means.

7. In a direct read secondary clock mechanism, a rotatable seconds member, a rotatable units minutes member, means normally rotating said seconds member continuously and uniformly at its normal time-keeping rate of one revolution per minute, Geneva driving gear mechanism operatively connecting said members whereby continuous rotation of the seconds member causes intermittent rotation of the units minutes member, a rotatable clock-advancing member, clutch means normally connecting said clock-advancing member and seconds member in driving relationship for causing the latter to rotate at the speed of the former, a latch member normally rendering said clutch means inoperative, means for tripping said latch member to permit said clutch means to become operative, said last mentioned means comprising an electromagnet responsive to the reception of a signal at a predetermined chronological time, an armature for said electromagnet, a trip member pivotally connected to said armature and movable bodily therewith, said trip member being movable when said armature is attracted by the electromagnet into frictional engagement with said seconds member and being movable tractionally upon such frictional engagement from an inoperative position to an operative position wherein it actuates said tripping means, and means operable upon rotation of said clock-advancing member for rendering said Geneva driving gear mechanism inoperative.

ALFRED B. BENSON.

No references cited.